May 7, 1968  F. R. ANDERSEN  3,381,707
AUTOMATIC CONTROL VALVE PARTICULARLY FOR GAS BOTTLES
Filed Oct. 31, 1966
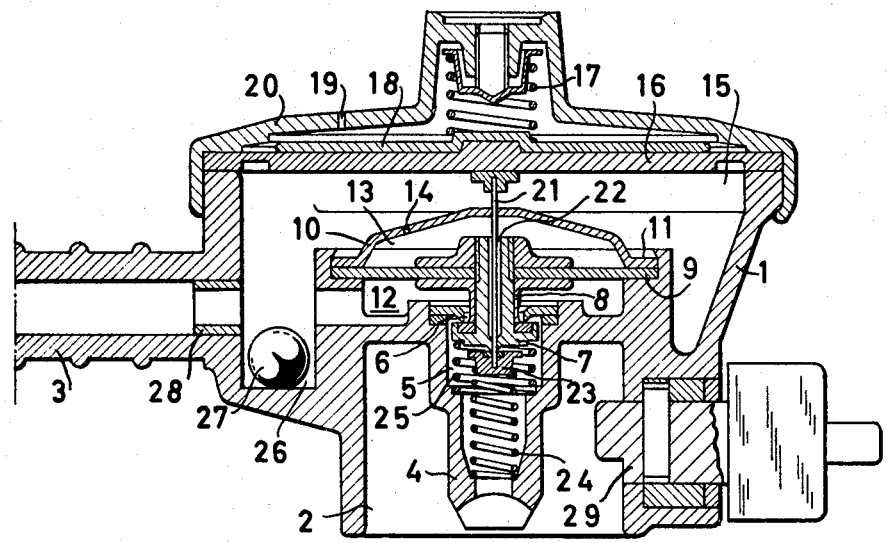

United States Patent Office 3,381,707
Patented May 7, 1968

3,381,707
AUTOMATIC CONTROL VALVE PARTICULARLY FOR GAS BOTTLES
Frede Reinholdt Andersen, deceased, late of Niverod, Denmark, by Edith Bruhn Andersen, administrator, Niverod, Denmark, assignor to A/S Teknova Nivaa, Denmark, a company of Denmark
Filed Oct. 31, 1966, Ser. No. 591,002
Claims priority, application Denmark, Nov. 10, 1965, 5,795/65
2 Claims. (Cl. 137—489.5)

ABSTRACT OF THE DISCLOSURE

A valve structure for the controlled discharge of a fluid, mainly bottled gas, comprising a pilot or auxiliary valve controlled by the discharge pressure to determine the admission of the fluid from an inlet to a control pressure chamber which is in open throttle communication with an outlet. The control pressure chamber is bounded by a yieldable member forming a partition between said chamber and an outlet chamber. The member carries a main valve cooperating with a main valve seat through which direct communication may be established between the inlet and the outlet chamber. The main valve is spring-loaded in its closing direction and is forced open by increasing the pressure difference between the control pressure chamber and the outlet chamber.

---

This invention relates to an automatic control valve which is particularly intended for use in connection with a gas bottle and which in a known manner has a valve body comprising an inlet and an outlet which are in communication with each other in part through a main valve which is spring-loaded in its closing direction, in part through an auxiliary valve which may likewise be spring-loaded in its closing direction and which is controlled by the momentary outlet pressure by means of a control pin operated by this pressure and controlling the value of the pressure prevailing in a control pressure chamber, which pressure in turn controls the movements of the main valve in the opening and closing directions.

In a known control valve of this type the main valve member comprises a cylindrical skirt which with a slight play encloses a guide fixed in the valve body and together with this guide bounds the control pressure chamber. The said play forms a throttling passage leading from the inlet of the valve body to this chamber, and the auxiliary valve controls the outlet opening of the control pressure chamber towards the outlet of the valve body.

The function of control in such known valves is based on the fact that the auxiliary valve through area, which need only have a small maximum value, is changed inversely proportional to variations in the outlet pressure and thereby, when the momentary consumption exceeds the passage capacity of the throttling passage, causes a reduction of the pressure in the control pressure chamber which thus forms a pressure relief chamber. By such reduction of the control pressure the closing force acting on the main valve will also be reduced. An increase in the outlet pressure will cause the auxiliary valve member to move towards its closing position so as to limit the discharge from the pressure relief chamber, in which the pressure will rise and cause the main valve member to move in its closing direction, so that the flow through the associated valve opening is reduced. Inversely will a drop in the momentary delivery pressure cause the auxiliary valve member to move towards its most open position, resulting in a further pressure reduction in the pressure relief chamber and thereby a reduction of the force acting on the main valve member in the closing direction thereof. Consequently, in this case the passage area through the valve opening forming the main communication between the inlet and the outlet of the valve body will increase.

Valves of the type referred to may in other words ensure the maintenance of an approximately constant outlet pressure or delivery pressure independently of the momentary consumption and pressure variations, if any, on the inlet side.

A condition of the correct functioning of this control valve is that the skirt of the main valve member is freely displaceable on the guide, as otherwise the main valve member will not move in the manner aimed at in the opening or closing directions in the case of variations in pressure. At the same time, however, the skirt and the guide must have a considerable extent in the axial direction to ensure the necessary drop in pressure between the valve body inlet and the pressure relief chamber. Hereby the dimension of the control valve in this direction is increased, and greater demands are put to the accuracy of manufacture of the components, inter alia with a view to the frictional conditions.

The present invention aims at providing a control valve which may be of a particularly compact construction and in which the problem with regard to friction is eliminated.

With a view to this and to gaining further advantages, which will appear from the following, the automatic control valve according to the invention is characterised in that the main valve member is carried by a diaphragm or a similar yieldable element which with its edge portion is secured in the valve body and which forms a partition between the control pressure chamber and the valve body outlet, so that via the diaphragm the pressure in the control pressure chamber loads the main valve member in its opening direction against the closing force exerted by the discharge pressure, the control pressure chamber being in communication with the valve body inlet through the auxiliary valve and with the outlet through a permanently open throttling communication.

The fact that the main valve member is carried by a diaphragm involves that it shall cooperate with no fixed parts of the valve structure except the associated valve seat, and this entails that the movements of the valve member cannot be hampered by frictional forces. To this must be added that the large area ratio between the diaphragm and the main valve member will result in a correspondingly large drop in pressure via the auxiliary valve and consequently a small drop in pressure between the control pressure chamber and the valve body outlet. This is an advantage both with regard to construction and with regard to the function of the control valve. Thus, due to the relatively low pressure in the control pressure chamber, the diaphragm and the solid wall of the chamber will only be subjected to a slight load and will consequently, in spite of being of a cheap manufacture, easily be able to provide the necessary tightness. Another advantage is that an opening in the solid wall for the passage of the control pin mentioned above may be made with a rather coarse tolerance without the accuracy of the control suffering thereby. Furthermore, the auxiliary valve need only have a small maximum through area which is necessary when it is desired to keep the outer dimensions of the control valve at a minimum without the power of control being reduced. The reason for this is that the sensitivity to variations in the pressure, particularly in the valve body inlet, is determined by the area ratio between the auxliary valve and the element controlled by the discharge pressure, usually a diaphragm, the movements of which are transferred to the auxiliary valve through the control pin.

In a preferred embodiment of the control valve according to the invention the diaphragm carrying the main valve member is provided with a central opening in which a boss is secured which carries or in itself forms the main valve member and which comprises an axial passage forming communication between the valve body inlet and the control pressure chamber, the inlet end of said passage being controlled by the auxiliary valve member. In this embodiment the auxiliary valve member thus co-operates directly with the main valve member, and hereby a particularly simple and compact construction is made possible.

The invention will now be more fully described with reference to the accompanying drawing which shows an axial section through the control valve in the embodiment explained in the foregoing paragraph.

The automatic control valve structure shown in the drawing comprises a valve body 1 with a downwards-directed inlet 2 and a laterally directed outlet 3 for communicating with a gas bottle and a gas tubing, respectively. In the inlet 2 a hollow stud 4 is provided which on the valve being mounted on a gas bottle is intended for opening a non-return valve located in the neck of the bottle, so that through the stud 4 the gas can flow up into a chamber 5. This chamber may be brought into communication with the outlet 3 through a main valve opening 6 which is controlled by a main valve member 7 carried by a boss 8 which is secured to the inner portion of an annular diaphragm 9. The outer edge of the latter is by means of a cover 10 clamped in a recess 11 in the valve body 1, so that the diaphragm forms a partition between a diaphragm chamber 12 in open communication with the outlet 3 and a control pressure chamber 13 located under the cover 10. This chamber 13 is in permanent open communication with the outlet 3 through a throttling passage in the form of a nozzle bore 14 in the cover 10.

The cover 10 forms a partition between the control pressure chamber 13 and a discharge chamber 15 in which the nozzle bore 14 terminates. The upper wall of the discharge chamber 15 is formed by a control diaphragm 16 which consequently is constantly loaded in the upward direction by the momentary discharge pressure or delivery pressure. In the opposite direction the control diaphragm 16 is loaded by an adjustable compression spring 17 which with its lower end bears against a diaphragm disc 18. The space above the control diaphragm 16 is in open communication with the surrounding atmosphere through an opening 19 in a cover 20.

On its underside the control diaphragm 16 carries a thin control pin 21 which extends through an opening in the cover 10 and further on through the control pressure chamber 13 and an axial passage 22 in the boss 8. On its lower end this control pin carries an auxiliary valve member 23 which is located in the chamber 5 and co-operates with an auxiliary valve seat formed by the underside of the main valve member 7. A comparatively weak compression spring 24 constantly loads the auxiliary valve member 23 in its closing direction, and a further closing spring 25 acts on the main valve member 7.

Adjacent the inlet end of the outlet branch 3 the outlet chamber 15 is provided with a recess 26 in which a loose ball 27 is placed which in the case of a sudden and violent drop in pressure in the discharge conduit, e.g. caused by a bursting tube, will get into blocking abutment on an associated valve seat formed by a bushing 28 inserted in the outlet branch 3.

29 indicates a lock for securing the valve body 1 to the neck of a gas bottle, not shown.

In the position shown in the drawing it is assumed that no gas is being taken from the outlet 3, and that the same pressure prevails in all parts of the valve body. Under these circumstances the main valve 7 as well as the auxilary valve 23 will be closed.

If gas is taken from the outlet 3, the pressure in the latter will drop, and this drop in pressure spreads to the underside of the upper or control diaphragm 16. The compression spring 17 will now cause a downward movement of this diaphragm and thereby also of the control pin 21, so that the auxiliary valve member 20 is raised from its annular valve seat on the underside of the main valve member 7.

If the momentary consumption does not exceed the passage capacity of the nozzle bore 14 not only the pressure in the control pressure chamber 13, but also the pressure in the chamber 12 under the diaphragm 9 will remain substantially unchanged, so that the main valve member 7 is still kept in sealing abutment on its valve seat. If, however, the gas consumption exceeds this very slight value, the pressure in the diaphragm chamber 12 and the discharge chamber 15 will drop. Hereby the diaphragm 16 moves further downwards, so that the auxiliary valve 23 is further removed from its seat. Consequently the pressure in the control pressure chamber 13 will rise, and the difference in pressure between this chamber and the diaphragm chamber 12 will via the diaphragm 9 and the boss 8 cause a downward movement of the main valve member 7, i.e. an opening of this valve, so that the gas can now flow direct from the inlet 2 through the main valve opening 6 and the diaphragm chamber 12 to the outlet 3. By the downward movement of the main valve member 7 the distance between the auxiliary valve member 23 and the seat of the latter will be reduced, and the pressure in the control pressure chamber 13 will consequently drop, so that the main valve member 7 will be moved correspondingly upwards in the direction towards its seat. At constant gas consumption the valve will quickly set itself in the position of equilibrium corresponding to the value of the consumption. This position of equilibrium will vary with pressure variations, if any, in the inlet 2, the said variations spreading to the control pressure chamber 13, and the result will be that such possible variations in pressure on the inlet side of the control valve will not, or at any rate only a very limited extent, influence the discharge pressure or delivery pressure at which the valve is set. The value of this pressure may be varied by a variation of the tension of the compression spring 17.

When the gas admission to the inlet 2 is closed, the compression spring 17 will constantly keep the valve open. If it is desired to avoid this, the control diaphragm 16 may directly or indirectly be connected to a manoeuvring member which is mounted on the outside of the cover 20 and which can lock the diaphragm and thereby the control pin 21 in the position shown in the drawing.

A particular advantage of the valve design referred to is that a pressure shock in the inlet 2, caused e.g. when the valve is mounted on a filled gas bottle, will be unable to force the main valve member 7 in the opening direction and will therefore not be able to spread to the outlet 3.

What I claim is:

1. An automatic control valve, particularly but not exclusively for gas bottles, comprising a valve body having an inlet and an outlet which are in communication with each other in part through a main valve, which is spring-loaded in its closing direction, and in part through an auxiliary valve which is controlled by a momentary discharge pressure, a control pin operated by said discharge pressure and operatively connected to said auxiliary valve to control the value of the pressure prevailing in a control pressure chamber, said pressure in said chamber in turn controlling the movements of the main valve in the opening and closing directions, a yieldable diaphragm element having its edge portion secured in the valve body, said main valve member being carried by said element, said element forming a partition between the control pressure chamber and the valve body outlet, so that the pressure in the control pressure chamber via the element loads the main valve member in its opening direction against the closing force exerted by the discharge pressure, the control pressure chamber being in communication with the valve body inlet through the auxiliary valve and with the outlet through a permanently open throttling communication.

2. An automatic control valve as claimed in claim 1, in which the element is provided with a central opening in which the main valve member is secured, an axial passage extending through said main valve member to form communication between the valve body inlet and the control pressure chamber, the inlet end of said passage being controlled by the auxiliary valve member.

References Cited

UNITED STATES PATENTS 1,229,726  6/1917  Ebeling _____ 137—489.5

M. CARY NELSON, *Primary Examiner.*

R. J. MILLER, *Assistant Examiner.*